United States Patent [19]
Cali et al.

[11] Patent Number: 5,647,732
[45] Date of Patent: Jul. 15, 1997

[54] UNIVERSAL THREADED ADAPTER

[75] Inventors: John J. Cali, Elgin; Richard L. Raz, Carol Stream, both of Ill.

[73] Assignee: Bonar Plastics, Inc., West Chicago, Ill.

[21] Appl. No.: 398,659

[22] Filed: Mar. 3, 1995

[51] Int. Cl.$^6$ .................................................. F04B 53/22
[52] U.S. Cl. ...................................... 417/360; 285/148.25
[58] Field of Search .............................. 417/360; 285/177, 285/12

[56] References Cited

U.S. PATENT DOCUMENTS

| | | |
|---|---|---|
| Re. 7,251 | 8/1876 | Caswell. |
| 168,970 | 10/1875 | Caswell. |
| 2,528,343 | 10/1950 | Davis. |
| 2,795,556 | 6/1957 | Hansen. |
| 5,253,900 | 10/1993 | Snyder. |

*Primary Examiner*—Timothy Thorpe
*Assistant Examiner*—Peter G. Korytnyk
*Attorney, Agent, or Firm*—Mathew R. P. Perrone, Jr.

[57] ABSTRACT

A universal threaded adapter to mount between a pump and a tank can be of two types. The universal threaded adapter is assembled from an adapter body with a tank to adapter gasket seal mounted therein, and a conversion plate, which may be bolted or otherwise secured to both the adapter body and the pump; to thereby efficiently join the pump to the tank. With the dual phase adapter attached to the pump through the mixing threads, the adapter may be shipped separately from the pump. The pumping mechanism provides an aperture with a seal to achieve the desired pumping device while at the same time permitting the required mixing.

17 Claims, 3 Drawing Sheets

UNIVERSAL THREADED ADAPTER

This invention relates to a threaded adapter and more particularly to a threaded universal pump adapter for permitting variety of agricultural chemical pumps to be attached to a variety of shuttle tanks having a common threaded male opening.

BACKGROUND OF THE INVENTION

Agriculture in the United States is a wonder of the world. Never before have so many people been fed by so few farmers. This miracle is accomplished with a very efficient processing mechanism with a combination of machinery, chemicals and other devices, in order to make the farmer in the United States more efficient than any other farmer in the world.

One of the key reasons, that the farmer in the United States is so efficient, relates to the adaptability of machinery and equipment. Within the machinery and equipment are a variety of pumps and tanks for spraying fertilizer and other desired elements on the crops. Unfortunately, these elements cannot be easily detached and reattached, or interchanged. Therefore, these elements reduce the efficiency that is so inherent in the production efficiency. A device to improve the efficiency of implement changing is clearly important.

A commonality of threads is lacking and an appropriate adaption mechanism for attaching these items to each other is not available. It is highly desirable, if detaching and reattaching of various implements one to the other can be more efficiently achieved. If such action can occur, great advantages are achieved in production and efficiency at a farm.

One difficulty in this structure is a proper sealing gasket. This gasket must be suitable for each system. The adapter body must be easily used and attached and used. The conversion has a similar problem. These features work against each other. It is highly desired to maximize the advantages of each feature for the most efficient cooperation, while avoiding the possible, conflicting disadvantages.

SUMMARY OF THE INVENTION

Among the many objectives of this invention is the provision of a universal threaded adapter for attaching a variety of agricultural chemical pumps to a shuttle tank with one common male threaded opening.

A further objective of this invention is to provide a universal threaded adapter having an easily bolted conversion plate.

A still further objective of this invention is to provide a universal threaded adapter with a flexible seal.

Yet a further objective of this invention is to provide a universal threaded adapter, which is easily disconnected.

Also an objective of this invention is to provide a universal threaded adapter, which is easily assembled.

Another objective of this invention is to provide a universal threaded adapter, which is usable with existing tank threads.

These and other objectives of the invention (which other objectives become clear by consideration of the specification, claims and drawings as a whole) are met by providing a universal threaded adapter assembled from an adapter body with a tank to adapter gasket seal mounted therein, and a conversion plate, which may be bolted or otherwise secured to the tank.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

The universal threaded pump adapter provides a system, by which a variety of agricultural chemical pumps can be attached to shuttle tanks with one common threaded male opening. This pump adapter is assembled from a universal pump adapter body, a conversion plate, a tank to adapter gasket seal, and conversion plate mounting bolts.

The tank to adapter seal is preferably an "O" ring style gasket used to create a seal between the tank and the universal pump adapter body.

The adapter body is a thick dish shaped part with female screw threads, which are of a size and configuration to mate with the shuttle tank. The female threads begin in the center of the bottom plane of the disc and continue up to the tank to adapter seal surface. The seal surface is formed from a step created by cylindrical opening of a smaller diameter than the female threads through to the top of the disc.

Around this cylindrical opening on the top plane of the disc are molded-in metal inserts with the female threads. The inserts are positioned uniformly around the cylindrical opening. The conversion plate is attached to the body with bolts.

Around the periphery of the top plane are notches. These notches form lugs by which this disc can be manually or mechanically gripped to tighten and seal the universal adapter to the tank. Each lug has a hole through it which can be used for a security seal.

The universal adapter is pre-assembled, with one body and one conversion plate which mates to whichever pump is to be used. The pump can either be attached to the universal adapter prior to or after mounting of the adapter to the tank. So the universal adapter is attached to the tank before or after it is secured to the pump.

Figure 1:
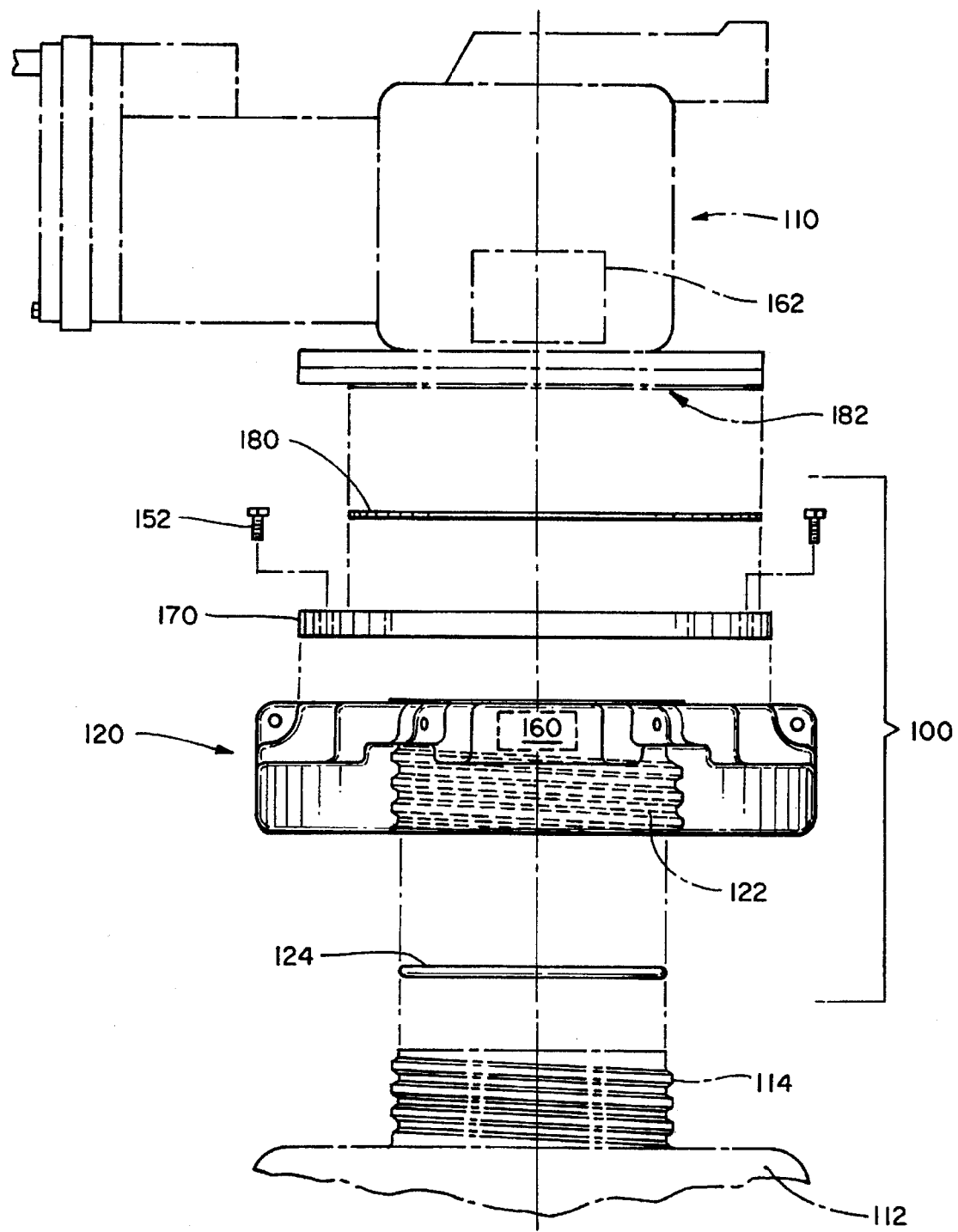
FIG. 1 depicts a perspective view of the universal threaded pump adapter 100 of this invention.

Referring now to FIG. 1, the universal threaded pump adapter 100 is attached to an agricultural pump 110 at the adapter plate 170. On the adapter body 120 is a common threaded female opening 122 to receive male tank threads 114 from tank 112.

This pump adapter 100 is assembled from a universal pump adapter body 120, a conversion plate 170, a tank to adapter gasket seal 124, and conversion plate mounting bolts 152.

The tank to adapter seal 124 is preferably an "O" ring style gasket used to create a seal between the tank 112 and the universal pump adapter body 120.

Figure 3:
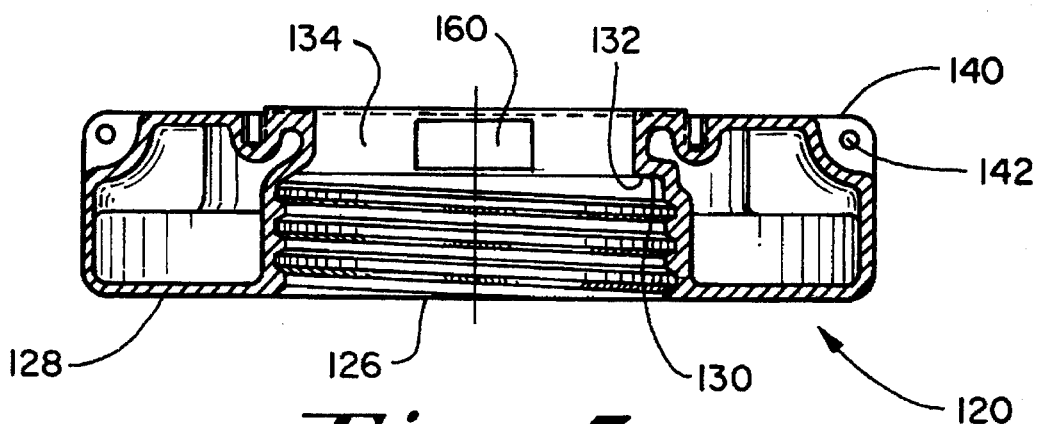
FIG. 3 depicts a side view of adapter body 120 for universal threaded pump adapter 100 of this invention.

As FIG. 3 depicts a side, partially cross-sectioned view of adapter body 120 for universal threaded pump adapter 100, the thread structure of female threaded opening 122 becomes more clear.

The adapter body 120 is a thick disc shaped part with female screw threads in female threaded opening 122, which are of a size and configuration to mate with the shuttle tank 112. The female threads therefor begin in the center 126 of the bottom plane 128 of the adapter body 120 and continue up to the tank to adapter seal surface 130.

The seal surface 130 is formed from a step 132 created by a cylindrical opening 134 of a smaller diameter than the female threads of female threaded opening 122. Cylindrical opening 134 continues through to the top of the disc forming the adapter body 120.

Figure 2:
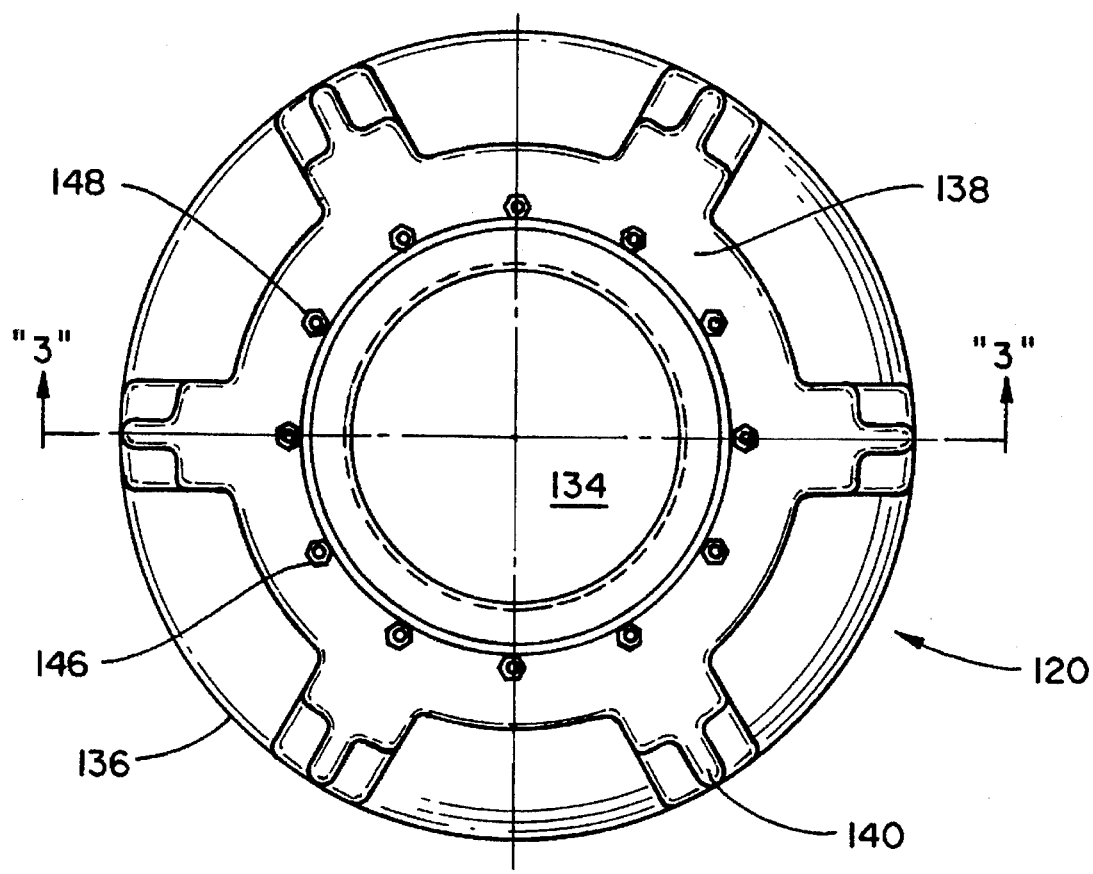
FIG. 2 depicts a side, partially cross-sectioned view of adapter body 120 for universal threaded pump adapter 100 of this invention.
Figure 4:
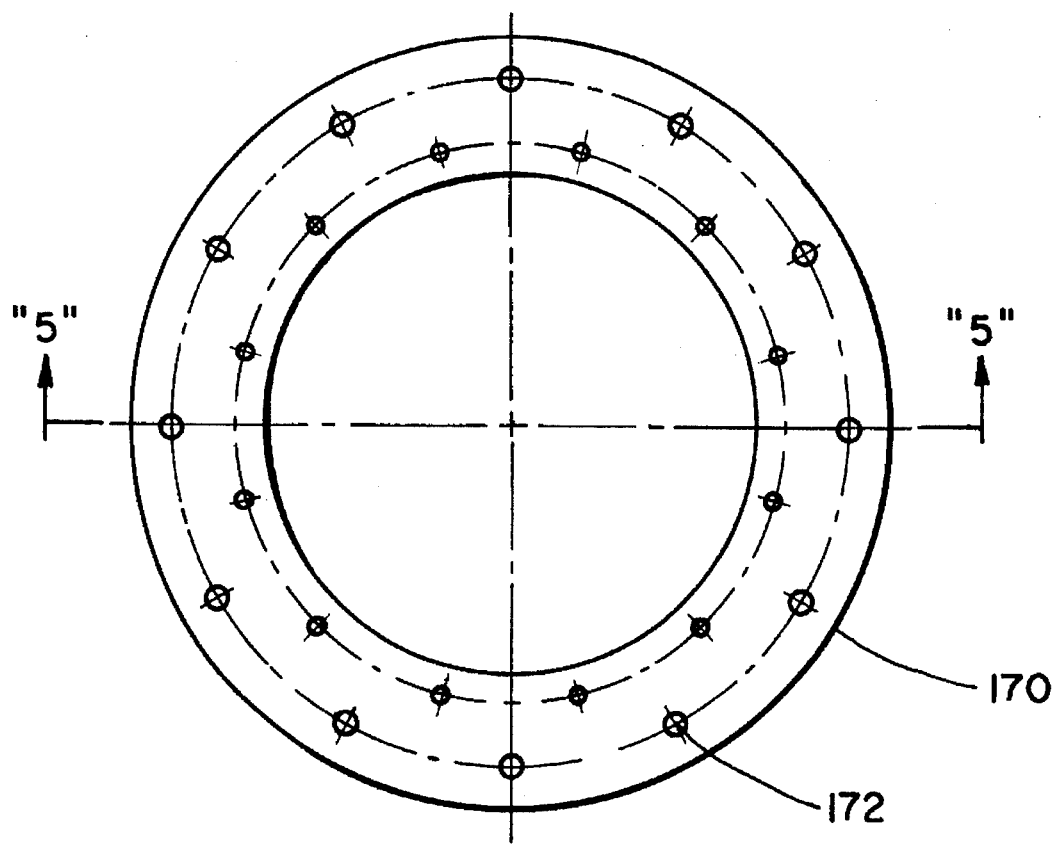
FIG. 4 depicts a top plan view of adapter body 120 for universal threaded pump adapter 100 of this invention.

As can be seen in FIG. 2 and FIG. 4, around the periphery 136 of the top plane 138 of adapter body 120 are notches 140, radially spaced therearound. Preferably, six of notch 140 are present. These notches 140 form lugs or gripping points, by which this adapter body 120 can be manually or mechanically gripped to tighten and seal the universal adapter 100 to the tank 112. Each notch 140 has a notch aperture 142, through which, a security seal may be inserted.

Around cylindrical opening 134 on the top plane 138 of the adapter body 120 are molded-in metal inserts 146 with the female bolt threads 148. The inserts 146 are positioned uniformly around the cylindrical opening 134.

Figure 5:
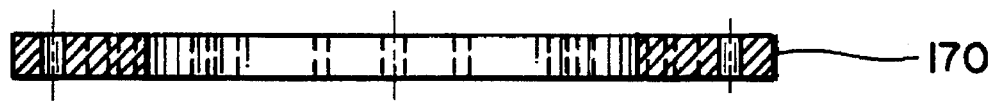
FIG. 5 depicts a top plan view of adapter plate 170 for universal threaded pump adapter 100 of this invention.

Adding FIG. 5 to the consideration, the conversion plate 170 is attached to the adapter body 120 at top plane 138 with a bolt 152 for each metal insert 146. Conversion plate 170 includes a plate aperture 172 for each metal insert 146.

Referring back to FIG. 1, pump gasket 180 fits between conversion plate 170 and pump 110. Each pump aperture 182 matches with a plate aperture 172 and a metal insert 146 to receive a bolt 152 and provide the appropriate mounting.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after, and only after, that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. In a connecting means for joining an agricultural tank to an agricultural pump, the improvement comprising:
   a) the connecting means being a universal threaded adapter;
   b) the universal threaded adapter including an adapter body, a tank gasket seal mounted in the adapter body, and a conversion plate securable to the pump;
   c) the tank gasket seal mounted therein being oppositely disposed from the conversion plate on the adapter body;
   d) the adapter body including a means for tightening the adapter body on the tank;
   e) the adapter body being a generally flat cylindrical body with a connecting aperture located on a cylindrical axis of the adapter body;
   f) a set of female threads being adjacent to the gasket seal in the aperture and suitable for attaching to the tank;
   g) the set of female threads terminating within the connecting aperture; and
   h) a shoulder within the connecting aperture to receive the tank gasket-seal.

2. The connecting means of claim 1 further comprising:
   a) a connecting means for securing the conversion plate securable to the pump and the adapter body; and
   b) the conversion plate including a plate aperture to communicate with the pump and the adapter body.

3. The connecting means of claim 2 further comprising:
   a) the connecting means for securing the conversion plate being at least one bolt and a corresponding bolt receiver; and
   b) the corresponding bolt receiver being in the adapter body and oppositely disposed from the tank gasket seal.

4. The connecting means of claim 3 further comprising:
   a) the corresponding bolt receiver being a molded-in metal insert with female threads; and
   b) each metal insert being positioned uniformly around the connecting aperture.

5. The connecting means of claim 4 further comprising:
   a) the adapter seal being an o-ring;
   b) a set of lugs being spaced around the adapter body and oppositely disposed from the tank; and
   c) the set of lugs providing a gripping point for tightening or loosening the adapter body.

6. The connecting means of claim 5 further comprising:
   a) each member of the set of lugs including a gripping aperture therein; and
   b) the conversion plate being chosen according to the pump used.

7. The connecting means of claim 6 further comprising:
   a) the universal adapter being pre-assembled with a body and a conversion plate; and
   b) the conversion plate being attachable to the pump.

8. The connecting means of claim 7 further comprising the conversion being attached to the pump and then to the adapter body.

9. The connecting means of claim 7 further comprising the conversion being attached to the adapter body and then to the pump.

10. The connecting means of claim 6 further comprising the universal adapter further including a pump seal between the pump and the conversion plate to cooperate therewith.

11. The connecting means of claim 6 further comprising the universal adapter further including a body seal between to cooperate with the pump and the conversion plate to cooperate therewith.

12. A universal threaded adapter for attaching a pump to a tank for an agricultural purpose, comprising:
   a) the universal threaded adapter including an adapter body, a tank gasket seal mounted in the adapter body, and a conversion plate securable to the pump;
   b) the tank gasket seal mounted therein being oppositely disposed from the conversion plate on the adapter body;
   c) the adapter body including a means for tightening the adapter body on the tank;
   d) the adapter body being a generally flat cylindrical body with a connecting aperture located on a cylindrical axis of the adapter body;
   e) a set of female threads being adjacent to the gasket seal in the aperture and suitable for attaching to the tank;
   f) the adapter body having an inlet means and an outlet means;
   g) the set of female threads terminating within the connecting aperture; and h) a shoulder within the connecting aperture to receive the tank gasket seal.

13. The universal threaded adapter of claim 12, further comprising the inlet means and the outlet means permitting pumping and mixing at substantially the same time.

14. The universal threaded adapter of claim 12, further comprising the universal threaded adapter being shipable separately from the pump.

15. The universal threaded adapter of claim 14, further comprising the inlet means and the outlet means permitting pumping and mixing at substantially the same time.

16. The universal threaded adapter of claim 15, further comprising:

(a) the seal being an O-ring seal;
 (b) the outlet means being an O-ring sealed outlet;
 (c) the O-ring sealed outlet protruding above a top of the mixing device at the tank adapter to permit at least one attachment to be bolted onto the pump.

17. The universal threaded adapter of claim 16, further comprising:

(a) the top of the mixing device further including a flange extending from an edge of the top of the mixing device;
 (b) the flange having a first corner and a second corner;
 (c) the first corner having a first aperture adjacent thereto;
 (d) the second corner having a second aperture adjacent thereto; and
 (e) the first aperture and the second aperture serving to permit an attachment of the universal threaded adapter to the pump and the tank.

* * * * *